United States Patent [19]
Peschel

[11] 3,880,505
[45] Apr. 29, 1975

[54] SINGLE FRAME MECHANISM FOR A MOTION PICTURE CAMERA

[75] Inventor: Heinz Peschel, Stuttgart-Zuffenhausen, Germany

[73] Assignee: Eastman Kodak Company, Rochester, N.Y.

[22] Filed: Nov. 5, 1973

[21] Appl. No.: 413,066

[30] Foreign Application Priority Data
Nov. 24, 1972 Germany............................ 7243151

[52] U.S. Cl. ............................................... 352/169
[51] Int. Cl. .......................................... G03b 21/38
[58] Field of Search........................... 352/169, 137

[56] References Cited
UNITED STATES PATENTS

| 1,407,357 | 2/1922 | Tartara | 352/169 |
| 2,981,145 | 4/1961 | Malek | 352/169 |
| 3,106,126 | 10/1963 | Kirk | 352/169 |

Primary Examiner—Monroe H. Hayes
Attorney, Agent, or Firm—J. Morrow

[57] ABSTRACT

A single frame mechanism is provided for use with a motion picture camera so as to permit either exposure of individual image frames by actuation of the single frame mechanism or multiple or a sequence of image frames by actuation of other mechanisms which provide for normal operation of the camera.

3 Claims, 2 Drawing Figures

SINGLE FRAME MECHANISM FOR A MOTION PICTURE CAMERA

BACKGROUND OF THE INVENTION

1. Field of the Invention

The present invention relates to a motion picture camera for exposing image frames on a received film strip and more specifically to a single frame mechanism for a motion picture camera to permit exposure of individual image frames.

2. Description of the Prior Art

Various types of single frame devices for motion picture cameras are generally well-known in the art. One such single-frame device disclosed in German Pat. No. 1,187,127 includes a rocker arm pivotable into either a locking or releasing position by a tension spring controlled by a release or trigger member. The path of pivotal movement of the rocker arm is preselected by setting a control member for either single frame or sequence modes of operation. If the sequence mode of operation is preselected and the release member is actuated by the operator, a lug on the rocker arm is removed from contact with a cam on the shutter and the shutter is free to rotate for exposing a series of images onto the film. If, however, the single frame mode of operation has been selected and the release member has been actuated, the shutter is released for only a single rotation and then it is again restrained by the lug on the rocker arm engaging a cam on the shutter. In the embodiment disclosed in that patent, the cams on the shutter are so arranged that upon the completion of exposure of a single image frame, the shutter is restrained in the closed position. While the embodiment performs the desired single frame mode of operation, the design of this device is comparatively complicated making it expensive to manufacture. Also, a desired sequence of pictures can be missed if the device has been accidentally or mistakingly preset for the single frame mode of operation. Thus, in operation of the apparatus, the operator must consciously check the control member to see if it has been properly set for the desired mode of operation.

Another type of release device is known from German Pat. No. 1,220,730 wherein separate release members are provided for each of the single frame and sequence modes. When the sequence release member is actuated, a cam on the shutter rod is released so that the shutter can run continuously until the sequence release member is no longer actuated. On operation of the release member for the single frame mode, release of the shutter rod cam also takes place but at the same time a stop is brought into its operative position such that when the shutter rod has rotated once the stop cooperates with a second cam to again arrest the rod. This device is not very suitable for economical manufacture either, owing to its complicated construction. Furthermore, when the release member is not fully depressed or when pressure is relieved from same member, a disturbing rattling noise can result from the contact of cam with the stop and with no locking taking place. This intermediate position also adversely affects the operating speed of the mechanism.

Other known single frame devices have been disclosed in U.S. Pat. Nos. 1,295,081; 2,453,301; 3,079,836; 3,106,126; 3,178,721; 3,195,146; 3,265,458; 3,436,148; and 3,603,678.

SUMMARY OF THE INVENTION

Accordingly, it is an object of the present invention to provide an improved single frame mechanism for use with a motion picture camera to provide simple and reliable operation such that the camera can expose either a single image frame or a sequence of image frames.

A further object of the present invention is to provide separate trigger members for a motion picture camera permitting either single frame operation and normal multiple frame operation, the trigger members permitting the operator to select the mode of operation by selecting the desired trigger member at the time of taking the pictures.

Another object of the present invention is to provide a single frame mechanism having a separate trigger member which is effective to energize the drive mechanism of the camera and to drive the shutter of the camera to expose individual image frames.

In accordance with these objects and others, a single frame mechanism is provided for exposing individual image frames onto a received film strip, the mechanism comprising a ratchet wheel coupling the drive means and the shutter of the camera, cam means coupled to the ratchet wheel for cooperating with a pawl member which is movable between an idle and an operative position for restraining the drive means when the pawl member is in the operative position, resilient means for urging the pawl member toward the operative position and release means engageable with the pawl member for moving the pawl member into the idle position, and means for energizing and de-energizing the drive means as said pawl member is moved between the idle and operative positions.

The invention and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Because motion picture cameras and related apparatus are well known, the present description will be directed in particular to elements forming part of or cooperating more directly with the present invention, portions of the camera or other apparatus not specifically shown or described herein being selectable from those known in the art.

Figure 1:
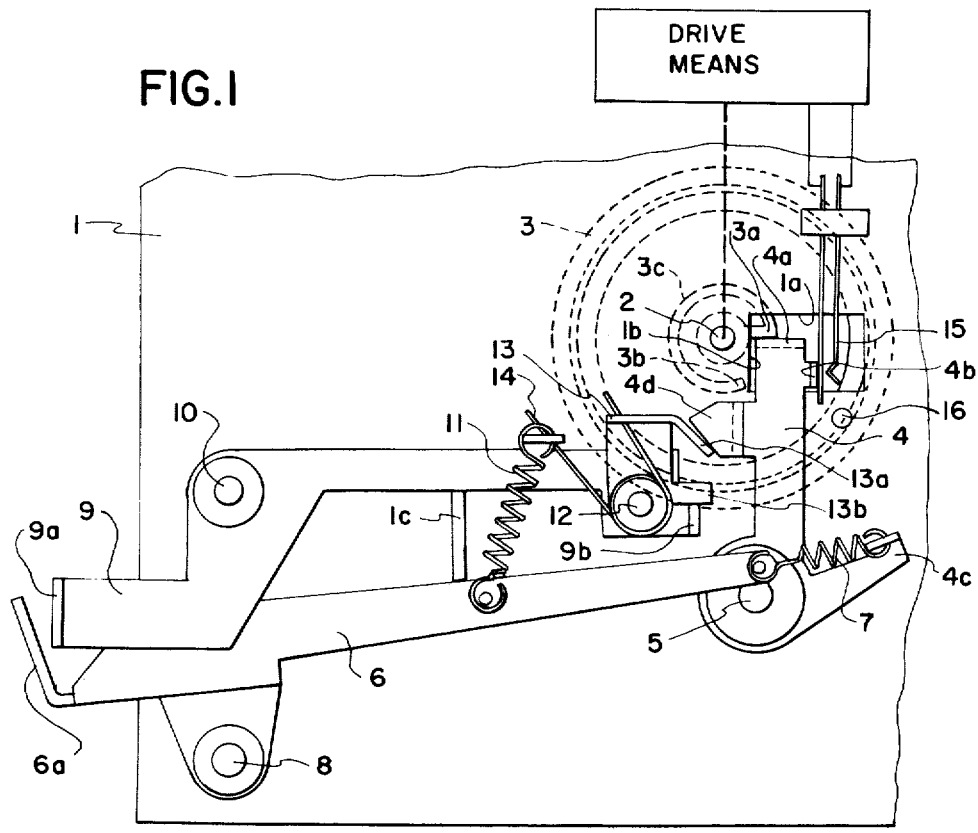
FIG. 1 is a plan view of a portion of a motion picture camera showing in detail a preferred embodiment of the present invention in an idle or unactuated position.

Referring now to FIG. 1, a mechanism or support plate 1 has affixed thereto pivot shafts 8 and 10 which are adapted for pivotally supporting release members 6 and 9, respectively, the release member both being resiliently urged toward the stop 1c by a spring 11 which interconnects the two members. As will be explained in greater detail, the release members 6 and 9 are operatively coupled to portions of the camera mechanism such that when release member 6 is actuated by the operator, a sequence of image frames is exposed and when the release member 9 is actuated individual image frames are exposed. In the preferred embodiment illustrated in the drawings, the release members 6 and 9 include actuation surfaces 6a and 9a, respectively, the actuation surfaces being laterally offset from each other such that the release members can be independently actuated by the operator.

Figure 2:
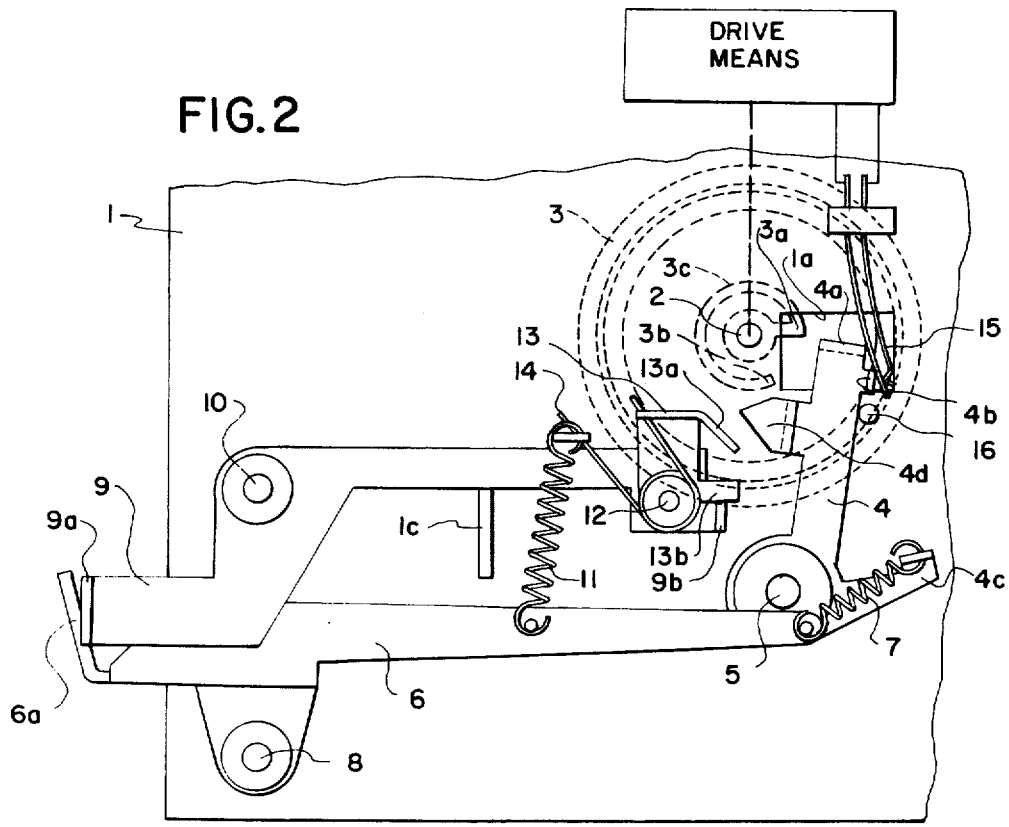
FIG. 2 is a view similar to that of FIG. 1 showing the preferred embodiment in an actuated position wherein the mechanism is operative to expose a sequence of image frames.

An irregularly shaped locking lever 4 is pivotally supported about a mounting 5 which extends from the support plate 1. Preferably, mounting 5 is positioned near the end of the release member 6 which is opposed to the actuation surface 6a. A spring 7 connects an extension or arm portion 4c of the locking lever 4 to the release member 6, one end of the spring 7 extending through the opening 6b in the release member. As a result of the geometric placement of the opening 6b, spring 7 and arm portion 4c, these members cooperate in an over center manner wherein movement of the release member 6 from the idle or unactuated (FIG. 1) position to the actuated (FIG. 2) position results in the locking lever 4 being pivoted about the mounting 5 by the spring 7 for actuation of the exposure mechanism of the motion picture camera as will be described.

As illustrated in the drawings, a tab portion 4a of the locking lever 4 is bent downward at substantially a right angle to the lever such that it projects downwardly through an opening 1a in the mechanism plate 1 wherein it is effective for cooperating with a control cam surface 3c for controlling the exposure mechanism of the camera. In the preferred embodiment illustrated, the cam surface 3c is integral with a ratchet wheel 3 which is included in a gear train (not shown) of the camera for driving a rotary disc shutter (not shown) such that image frames are exposed upon a received film strip. As shown, the ratchet wheel 3 is rotatably supported on the underside of the mechanism plate 1 by a bearing 2 with the cam surface 3c being positioned between the ratchet wheel 3 and the support plate 1 such that it is accessible for cooperating with the tab portion 4a of the locking lever 4. Preferably, the control cam 3c includes a recess or stop portion which is defined by surfaces 3a and 3b which are effective to restrain the tab portion 4a in the initial idle position illustrated in FIG. 1, wherein tab portion 4a rests against the edge 1b of the opening 1a. When the tab portion 4a is positioned within the recess, the shutter is restrained in a closed position and scene light is thereby prevented from striking the film for exposing image frames.

A lug portion 4b extends from the locking lever 4 and is positioned to contact and close a normally open electrical contact or switch 15 which is connected in series with the drive mechanism (schematically shown) of the preferred embodiment of the camera. Locking lever 4 also includes a control member 4d which cooperates with a pawl 13, 13a which is pivotally mounted to the release member 9 by a pin 12. The pawl is resiliently urged in a clockwise direction about the pin by a spring 14 to the position shown in FIGS. 1 and 2 wherein a projection 13b of the pawl is urged against a tab portion 9b of the release member 9.

In operation of the preferred embodiment shown in the drawings, the actuation of the release member 6 by the operator applying force to the actuation surface 6a results in the movement of the release member from the unactuated (FIG. 1) position to the actuated (FIG. 2) position wherein the opening 6b of the release member 6 is moved to the position below the mounting 5. As a result, spring 7 urges the locking lever 4 to be pivoted in a clockwise direction about the mounting 5 such that tab portion 4a is removed from contact with the surface 3a of the control cam surface 3c and the lug portion 4b of the locking lever 4 contacts and closes the electrical switch 15 for energizing the drive mechanism of the camera. When thus energized, the drive mechanism of the camera drives the ratchet wheel 3 through the gear train and in turn the rotary disk shutter (not shown) is rotatably driven for exposing the film. When the locking lever 4 is in the actuated (FIG. 2) position, it is resiliently urged against the stop 16 which extends upwardly from the supporting plate 1 and while the locking lever 4 is maintained in this position, the ratchet wheel 3 is permitted to continue to rotate in the clockwise direction as indicated by arrow until the operator terminates the exposure by removing pressure from the actuation surface 6a of the release member 6. When the pressure on the release member 6 is removed, the release member is resiliently urged to return to its initial idle (FIG. 1) position by the spring 11. The resulting counterclockwise pivoting movement of the release member 6 results in the opening 6b once again being moved above the center of the mounting 5 wherein the locking lever 4 is urged in the counterclockwise direction about mounting 5 by the urging of spring 7. Depending on the position of the control cam surface 3c when the release member 6 returns to the idle (FIG. 1) position, the tab portion 4a of the locking lever 4 either drops into the recess between the end surfaces 3a, 3b for arresting the rotation of the ratchet wheel 3 which in turn permits the tab 4b to be removed from contact with the electrical switch 15 for de-energizing the drive mechanism of the camera or the tab portion 4a contacts the control cam surface 3c until the ratchet wheel 3 rotates to the position shown in FIG. 1 wherein the tab portion 4a can drop into the recess for locking and de-energizing the device as described immediately above. When in this position, the rotary disk shutter (not shown) is held in the closed position to prevent further exposure of the film. The shutter is restrained in this position and prevented from further rotation through the cooperation of the tab portion 4a of the locking lever 4 with the edges 3a, 3b of the ratchet wheel 3. The preferred arrangement illustrated of the locking lever 4 and the surfaces 3a and 3b of the control cam 3 prevents the locking lever 4 from achieving any intermediate position. That is, with the release member 6 in the idle (FIG. 1) position or in the actuated (FIG. 2) position, the spring 7 is effective to urge the locking lever 4 between the engaged or released positions which correlates with the movement of the release member 6.

For single frame mode of operation, the release member 9 can be actuated by the operator applying force to the actuation surface 9a of the release member 9 which results in a counterclockwise movement of the release member about the stud shaft 10. This counterclockwise movement of the release member 9 is effective to cause the tab portion 9b of the release member to cooperate with the pawl 13 and to move the pawl such that the angularly inclined tab 13a contacts the extension or control portion 4d of the locking lever 4. The force applied to the extension 4d by the tab 13a is then effective for urging the locking lever 4 in a clockwise direction about the mounting 5 against the resilient urging of spring 7 resulting in the release of the tab portion 4a from restraining the ratchet wheel 3 and for energizing the drive mechanism of the camera in the manner previously described. As the release member 9 is continued in the counterclockwise direction, the inclined tab 13a of the pawl 13 becomes separated from the control portion 4d and the locking lever 4 is again free for cooperating with control cam 3 under the resilient urging of spring 7. When the locking lever 4 returns in the counterclockwise direction about the mounting 5, the tab portion 4a of the locking lever 4 first contacts the rotating control cam 3c of the ratchet wheel 3 and is restrained then until said wheel completes one revolution and then it is arrested by the locking lever 4, 4a and the drive mechanism of the camera is de-energized as previously described. Since the pawl 13, 13a separates from the control member 4d almost immediately as the locking lever 4 is moved to the single frame operating position wherein the tab portion 4a contacts the control cam 3c, the portion 4a is urged into the opening between 3a and 3b by the spring 7 as soon as one rotation of the ratchet wheel or control cam has been made. In the preferred embodiment of the camera illustrated, the single rotation of the ratchet wheel actuates the rotary disk shutter for exposing a single image frame.

When the release member 9 is no longer actuated by the operator, the force of the spring 11 returns the release member in the clockwise direction about the pivot stud 10 to the unactuated (FIG. 1) position wherein the release member 9 is in contact with the stop 1c. As the release member 9 is returned, the inclined surface 13a of the pawl again contacts the control member 4d which results in the pawl 13 being urged in a counterclockwise direction about the pin 12 against the urging of the spring 14 until the inclined tab 13a separates from the control member 4d and the pawl 13 is urged by spring 14 in the clockwise direction about the pin 12 until the projection 13b of pawl 13 is once again against the bent-off portion 9b of the release member 9 as shown in FIG. 1. To expose a series of single image frames, the operator need only to intermittently actuate and release the release member 9 in the manner described.

In the preferred embodiment of the present invention, actuation surface 9a of the release member 9 is preferably concealed in the camera and operable by virtue of a wire release member, however, as with other portions of the present invention, variations and modifications can be effected within the spirit and scope of the invention.

I claim:

1. A motion picture camera having a shutter adapted for exposing image frames onto a received film strip, said camera comprising:
   a. a frame;
   b. a cam rotatably supported by said frame, said cam having a surface with a discontinuity therein, said cam being operatively coupled to the shutter of the camera;
   c. drive means for rotatably driving said cam;
   d. pawl means pivotably mounted to said frame such that said pawl means is engageable with said surface of said cam and is receivable in said discontinuity in said surface;
   e. switch means connected to said drive means and conditionable by said pawl means to either (1) a first condition wherein said switch means energizes said drive means when said pawl means is removed from said discontinuity in said surface and (2) a second condition wherein said switch means de-energizes said drive means when said pawl means is received in said discontinuity;
   f. a first release member supported by said frame, said first release member being movable between first and second positions;
   g. resilient means coupling said pawl means to said first release means, said resilient means for urging said pawl means between (1) a first position wherein said pawl means is restrained from being received into said discontinuity in said cam surface when said first release member is in said first position thereby conditioning said switch means in its first condition and (2) a second position wherein said pawl means is urged into engagement with said cam surface and is received by said discontinuity when said first release means is in its second position thereby conditioning said switch means in its second condition;
   h. a second release member supported by said frame, said second release member being movable between first and second positions; and
   i. means coupled to said second release member, said means being adapted to cooperate with said pawl means to initiate movement of said pawl means from its first position toward its second position when said second release member is moved from its first position toward its second position.

2. For a motion picture camera having shutter means adapted to expose image frames onto a received film strip, drive means for driving said shutter means, and switch means for controlling said drive means, the improvement comprising:
   a. cam means rotatably supported by said camera, said cam means having a recess defined therein and being operatively coupled to said shutter means such that said cam means is rotatably driven by said drive means;
   b. a pawl member movably mounted to said camera, said pawl member being movable from a first position wherein said pawl member is spaced from said cam member to a second position wherein it is placed into engagement with said cam member, said pawl member being adapted to be received into said recess in said cam surface when in said second position;
   c. switch means for energizing said drive means, said switch means being actuable by said pawl means such that said switch means energizes said drive means when said pawl means is removed from said recess;
   d. first release means supported by said camera for movement between an unactuated position and an actuated position.
   e. means coupling said first release means and said pawl means such that movement of said first release means to said actuated position is effective to remove said pawl from said recess; and
   f. second release means mounted to said camera for movement between an unactuated position and an actuated position wherein said release means cooperates with said pawl means for momentarily removing said pawl means from said recess and there-after releasing said pawl to re-engage said cam means.

3. The improvement as set forth in claim 2 wherein said second release means comprises:
  a. a member pivotably supported by said camera for movement between an actuated and an unactuated position; and
  b. means supported by said member and being restrained by said lever from moving in a first direction while being permitted to be moved in a second and opposite direction, said means being suitable for moving said pawl member toward its first position.

* * * * *